(12) United States Patent
Fagnani et al.

(10) Patent No.: US 6,946,819 B2
(45) Date of Patent: Sep. 20, 2005

(54) DEVICE FOR THE CORRECTION OF THE POWER FACTOR IN POWER SUPPLY UNITS WITH FORCED SWITCHING OPERATING IN TRANSITION MODE

(75) Inventors: Mauro Fagnani, Nerviano (IT); Albino Pidutti, Udine (IT); Claudio Adragna, Monza (IT)

(73) Assignee: STMicroelectronics S.r.l., Agrate Brianza (IT)

(*) Notice: Subject to any disclaimer, the term of this patent is extended or adjusted under 35 U.S.C. 154(b) by 27 days.

(21) Appl. No.: 10/633,321

(22) Filed: Aug. 1, 2003

(65) Prior Publication Data
US 2004/0100237 A1 May 27, 2004

(30) Foreign Application Priority Data
Aug. 1, 2002 (EP) .............................. 02425509
Aug. 1, 2002 (EP) .............................. 02425510

(51) Int. Cl.$^7$ ................................. G05F 1/70
(52) U.S. Cl. ................. 323/207; 323/222; 323/285
(58) Field of Search ................. 323/205, 207, 323/210, 211, 222, 223, 282, 283, 285

(56) References Cited
U.S. PATENT DOCUMENTS 5,349,284 A * 9/1994 Whittle ..................... 323/207
5,614,810 A    3/1997 Nostwick et al.
5,867,379 A * 2/1999 Maksimovic et al. ........ 363/89
5,949,229 A * 9/1999 Choi et al. .................. 323/320
6,222,746 B1 * 4/2001 Kim ............................ 363/89
6,657,417 B1 * 12/2003 Hwang ........................ 323/222

OTHER PUBLICATIONS

Siemens Semiconductor Group—Power Factor Controller TDA 4817, Online, May 1995 XP002234890.

* cited by examiner

Primary Examiner—Adolf Berhane
(74) Attorney, Agent, or Firm—Lisa K. Jorgenson; Bryan A. Santarelli; Graybeal Jackson Haley LLP

(57) ABSTRACT

A device for the correction of the power factor in power supply units with forced switching operating in transition mode is described. The device comprises a converter and a control device coupled to said converter so as to obtain from an alternating network input voltage a regulated output voltage on the output terminal. The converter comprises a power transistor and the control device comprises a pilot circuit suitable for determining the period of switched-on time and the period of switched-off time of said power transistor and control means coupled to said pilot circuits and with said converter and which are capable of prolonging said period of switched-on time of the power transistor at the instants of time in which the alternating network voltage substantially assumes the value zero.

31 Claims, 9 Drawing Sheets

DEVICE FOR THE CORRECTION OF THE POWER FACTOR IN POWER SUPPLY UNITS WITH FORCED SWITCHING OPERATING IN TRANSITION MODE

CROSS-REFERENCE TO RELATED APPLICATIONS

This application is related to U.S. patent app. Ser. No. 10/633,322 entitled "DEVICE FOR THE CORRECTION OF THE POWER FACTOR IN POWER SUPPLY UNITS WITH FORCED SWITCHING OPERATING IN TRANSITION MODE," which was filed on the same day as the present application and which is incorporated by reference.

PRIORITY CLAIM

This application claims priority from European patent application No. 02425510.1, filed Aug. 1, 2002, and European patent application No. 02425509.3, filed Aug. 1, 2002, which are incorporated herein by reference.

TECHNICAL FIELD

The present invention generally refers to a device for the correction of the power factor in power supply units with forced switching operating in transition mode.

BACKGROUND

These devices are generally used for the active correction of the power factor (PFC) for power supply units with forced switching used in common electronic appliances such as computers, televisions, monitors, etc and to power fluorescent lamps, in other words pre-regulation stages with forced switching which have the task of absorbing from the network supply a current that is virtually sinusoidal and is in phase with network voltage. A power supply unit with forced switching of the present type therefore comprises a PFC and a DC-DC converter connected to the PFC output.

A traditional power supply unit with forced switching comprises a DC-DC converter and an input stage connected to the electric energy distribution network, consisting of a full-wave diode rectifier bridge and of a capacitor connected immediately downstream so as to produce a non-regulated direct voltage from the network alternating sinusoidal current. The capacitor has sufficiently large capacity because the ripples, i.e., undulation of the voltage across it is relatively small compared with the DC level. The bridge rectifier diodes therefore conduct only a small portion of each half cycle of the network voltage because the momentary value of the network voltage is lower than the voltage on the capacitor for most of the cycle. The current absorbed by the network will accordingly be a series of narrow pulses the amplitude of which is 5 to 10 times the resulting average value.

This has considerable consequences: the current absorbed from the line has peak and effective values that are much greater than in case of the absorption of sinusoidal current, the network voltage is distorted by the almost simultaneous pulsed absorption of all the appliances connected to the network, in the case of three-phase systems the current in the neutral conductor is greatly increased and the energy potential of the system for producing electric energy is poorly used. In fact, the wave shape of a pulsed current is very rich in odd harmonic distortions that, whilst not contributing to the power returned to the load, contribute to increasing the effective current absorbed by the network and therefore to increasing the dissipation of energy.

In quantitative terms this can be expressed in terms of power factor (PF), defined as the ratio between real power (the power that the power supply unit returns to the load plus the power dissipated inside it in the form of heat) and apparent power (the product of the effective network voltage for the effective absorbed current), both in terms of total harmonic distortion (THD), generally defined as the percentage ratio between energy associated with all the harmonic distortions of a superior order and that associated with the fundamental harmonic distortion. Typically, a power supply unit with a capacitive filter has a PF between 0.4–0.6 and a THD greater than 100%.

A PFC arranged between the rectifier bridge and the input of the DC-DC converter enables a virtually sinusoidal current to be absorbed from the network, which current is in phase with the voltage and brings PF close to 1 and reduces THD.

The PFCs generally comprise a converter provided with a power transistor and an inductor coupled to it and a control device coupled to the converter in such a way as to obtain from a network alternating input voltage a DC voltage regulated at the output. The control device is capable of determining the period of switched-on time Ton and the period of switched-off time Toff of the power transistor; the union of the period of Ton and the period of Toff time gives the cycle period or switching period of the power transistor.

The commercially available PFC circuit types are basically of two kinds that differ according to the different control technique used: pulse width modulation (PWM) control with fixed frequency wherein current is conducted continuously into an inductor of the power supply unit and variable frequency PWM control, also known as 'transition mode' (TM) because the inductor current is reset (i.e., zeroed) exactly at the end of each switching period. TM control can be operated both by controlling inductor current directly or by controlling the period of Ton time. The fixed-frequency control technique provides better performance but uses complex circuit structure whereas TM technique requires a more simple circuit structure. The first technique is generally used with high power levels whilst the second technique is used with medium—low power levels, normally below 200 W.

FIG. 1 is a diagrammatic view of a PFC pre-regulatory stage of the TM type comprising a boost converter 20 and a control device 1. The boost converter 20 comprises a full-wave diode rectifier bridge 2 with Vin network voltage input, a capacitor C1 (that is used as a high-frequency filter) with a terminal connected to the diode bridge 2 and the other terminal earthed, an inductor L connected to a terminal of the capacitor C1, an MOS power transistor M with the drain terminal connected to a terminal of the inductance L downstream of the latter and having the source terminal connected to a grounded resistance Rs, a diode D having the anode connected to the common terminal of the inductor L and the transistor M and the cathode connected to a capacitor Co, having the other terminal grounded. The boost converter 20 generates a DC output voltage Vout on the capacitor Co that is greater than the network maximum peak voltage, typically 400 V for systems powered by European network supplies or by a universal supply. Said output voltage Vout will be the input voltage of the DC-DC converter connected to the PFC.

The control device 1 has to maintain the output voltage Vout at a constant value by feedback control. The control device 1 comprises an error amplifier 3 suitable for comparing part of the output voltage Vout, in other words the voltage Vr deriving from $Vr = R2 \cdot Vout/(R2+R1)$ (where resistances R1 and R2 are serially connected together and parallel to the capacitor Co) with a reference voltage Vref, for example 2.5V, and generates an error signal proportionate to their difference. The undulation frequency of output voltage Vout is twice that of the network voltage and is superimposed on the DC value. However, if the bandwidth of the error amplifier is significantly reduced (typically to below 20 Hz) by means of a suitable compensation network comprising at least one capacitor and we assume virtually stationary operation, in other words with constant direct effective input voltage and output load, said undulation will be greatly attenuated and the error signal will become substantially constant.

The error signal Se is sent to a multiplier 4, where it is multiplied by a signal Vi given by part of the network voltage rectified by the diode bridge 2. At the output of the multiplier 4 there is a signal Sm provided as a rectified sinusoidal current, the amplitude of which depends on the effective network voltage and on the error signal.

The signal Sm is sent to the inverting input of a PWM comparator 5 whereas the signal Srs across the resistance Rs is provided to the non-inverting input. If the signals Srs and Sm are the same, the comparator 5 sends a signal to a control block 6 that pilots the transistor M, which in this case switches it off. In this way the output signal Sm of the multiplier determines the peak current of the transistor M and this is then enveloped by a rectified sinusoidal current. A filter at the stage input eliminates the switching frequency component so that the current absorbed by the network has the form of the sinusoidal envelope.

After the MOS has been switched off the inductor releases the energy stored in it onto the load until it is completely emptied. At this point, the diode opens and the drain node of the MOS continues to float, so that its voltage moves towards the momentary input voltage through resonance oscillations between the stray capacitance of the node and the inductor inductance. The drain voltage is thus rapidly reduced, said drain voltage being coupled to the pin to which a block is connected that detects current 7 zeroes, which detector block belongs to the block 6, by means of the auxiliary coil of the inductor. The block 6 furthermore comprises an OR gate 8 having an input connected to the block 7 and the other input connected to a starter 10, suitable for sending a signal to the OR gate 8 at the instant of initial time; the output signal S of the OR gate 8 is the set input S of a set-reset flip-flop 11 having another input R, which is the output signal of the device 5, and having an output signal Q. The Q signal is sent to the input of a driver 12 that controls switch-up or switch-off of the M transistor.

A PFC absorbs an almost sinusoidal current that is not completely sinusoidal. There are two main sources of the residual distortion, which tends to maintain a not insignificant THD. The first is undulation with a frequency which is twice that of the network superimposed on the signal Se, if it is at a DC level present leaving the error amplifier, which introduces a $3^{rd}$ harmonic distortion in the current reference generated by the multiplier. The second is cross distortion, which is seen as a short flat zone in the wave form of the network current IR, corresponding to the network voltage zeroes, which correspond to the minimum values VC1min of the voltage VC1 across the capacitor C1, as shown in FIG. 2, which shows the current IR and the voltage VC1 across the capacitor C1, in two cases with Vin=220Vac and input Pin power=80 W (FIG. 2a) and Vin=220Vac and Pin=40 W (FIG. 2b). The cross distortion increases as the PFC load decreases and as effective network voltage increases.

The cause of this distortion is the defective transfer of input-output energy that occurs near the zeroes of the network voltage. In this zone the energy stored in the inductor L is very low, insufficient to load the stray capacitance of the drain node of the MOS to the output voltage Vout (typically 400V) so as to enable the passage of current through the diode D and transfer the energy of the inductor L to output. As a result, the diode is not switched on for a certain number of switching cycles and the energy network remains confined in the resonating circuit consisting of said stray capacitance and of the inductor L. This phenomenon, which is accentuated by the presence of the high frequency filter capacitor C1 after the rectifier bridge, is shown in detail in FIG. 3, in which the current IR and the voltage Vdrain are shown in a zone in which the current IR is flat.

SUMMARY OF THE INVENTION

In view of the state of the technique described, an embodiment of the present invention is a device for the correction of the power factor in power supply units with forced switching operating in transition mode that enables cross distortion to be minimised.

According to this embodiment, the device for the correction of the power factor in power supply units with forced switching operating in transition mode, comprises a converter and a control device coupled to said converter so as to obtain from a network alternating input voltage a voltage regulated on the output terminal, said converter comprising a power transistor, said control device comprising a pilot circuit suitable for determining the period of switched-on and switched-off time of said power transistor, characterised in that said control device comprises control means coupled to said pilot circuit and with said converter and which is capable of prolonging said period time during which the transistor is switched at the instants of time in which said network alternating voltage substantially assumes a zero value.

Said converter preferably comprises a rectifier circuit of said network input voltage, said control device comprises an error amplifier that has on the inverting input a first signal that is proportionate to said regulated voltage and on the non-inverting terminal a reference signal and said pilot circuit comprises a multiplier having at the input a second signal that is proportionate to the voltage rectified by said rectifier circuit and an error signal leaving said error amplifier, a comparator suitable for comparing a third output signal from said multiplier and a fourth signal that is proportionate to the current that flows through said power transistor, the fifth output signal from said comparator being suitable for determining the periods of time during which said power transistor is respectively switched on and switched off, said control means being suitable for increasing the value of one of said third or fourth signals at the comparator input at the instants of time in which the network voltage has a value that is substantially zero.

BRIEF DESCRIPTION OF THE DRAWINGS

Characteristics and advantages of the present invention will appear evident from the following detailed description of its embodiments thereof, illustrated as non-limiting examples in the enclosed drawings, in which.

DETAILED DESCRIPTION

Figure 1:
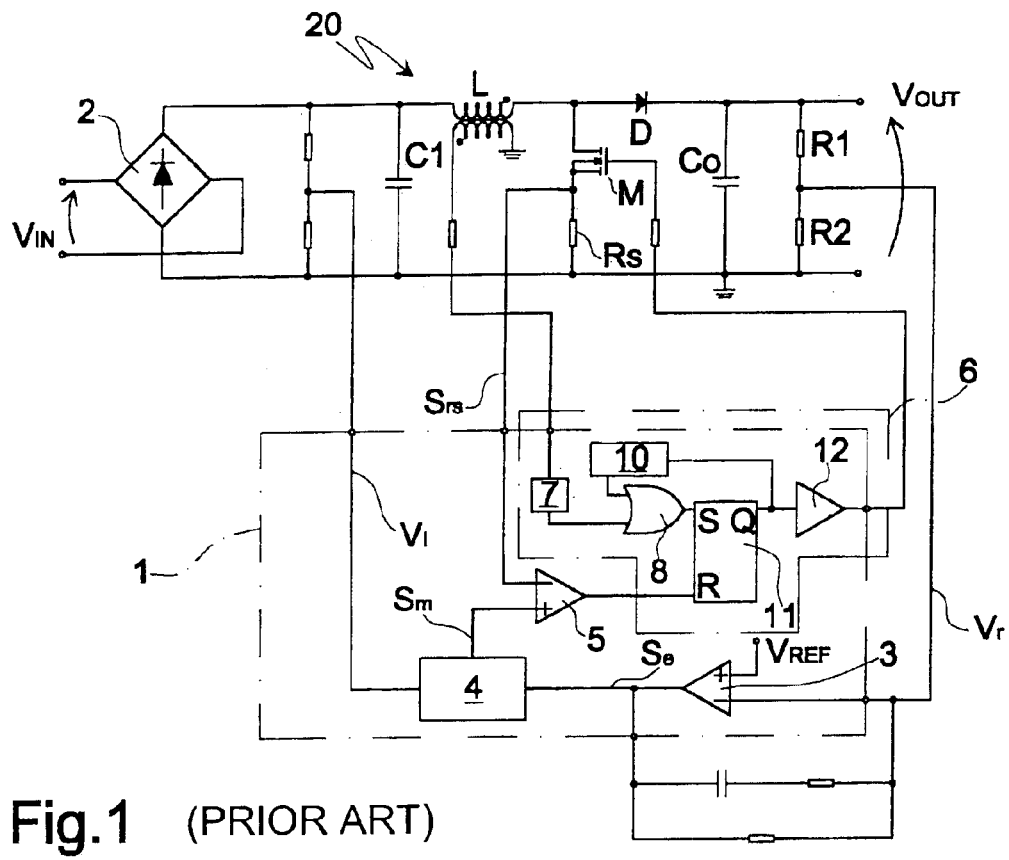
FIG. 1 is a circuit diagram of a PFC in transition mode for a prior-art power supply unit with forced switching.
Figure 3:
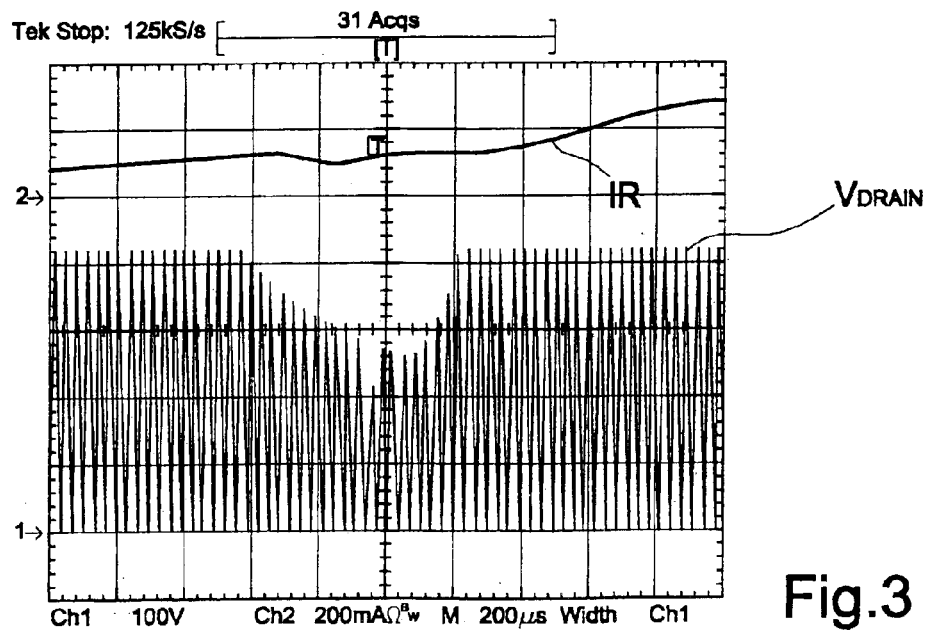
FIG. 3 shows, around a zero of network voltage, the network current and the voltage on the drain terminal of the MOS terminal of the PFC in FIG. 1.
Figure 2A:
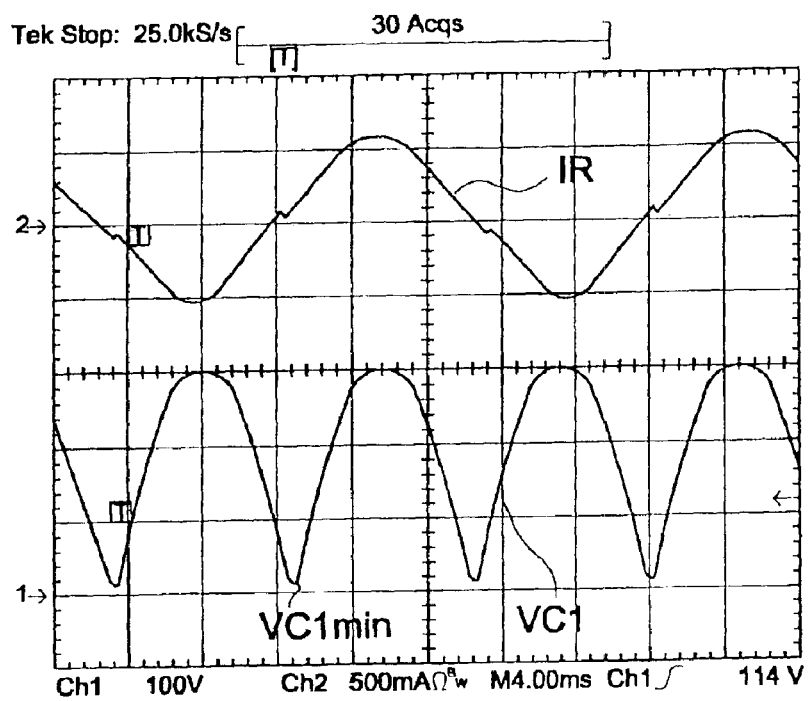
FIGS. 2a, 2b show diagrams obtained by an oscilloscope that show the network current and the rectified network voltage taken across the capacitor placed immediately after the rectifier bridge of the PFC of FIG. 1 with differing input power.
Figure 2B:
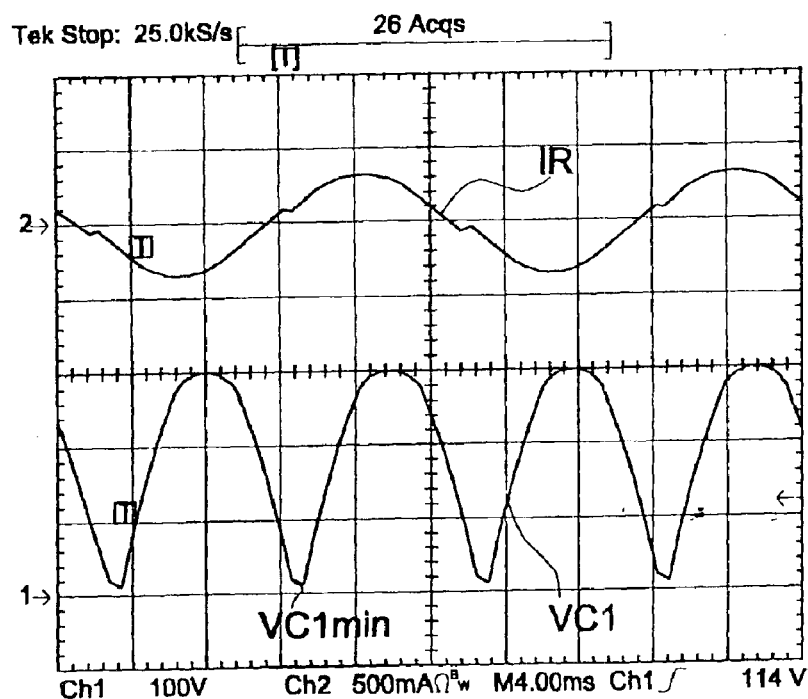
Figure 4:
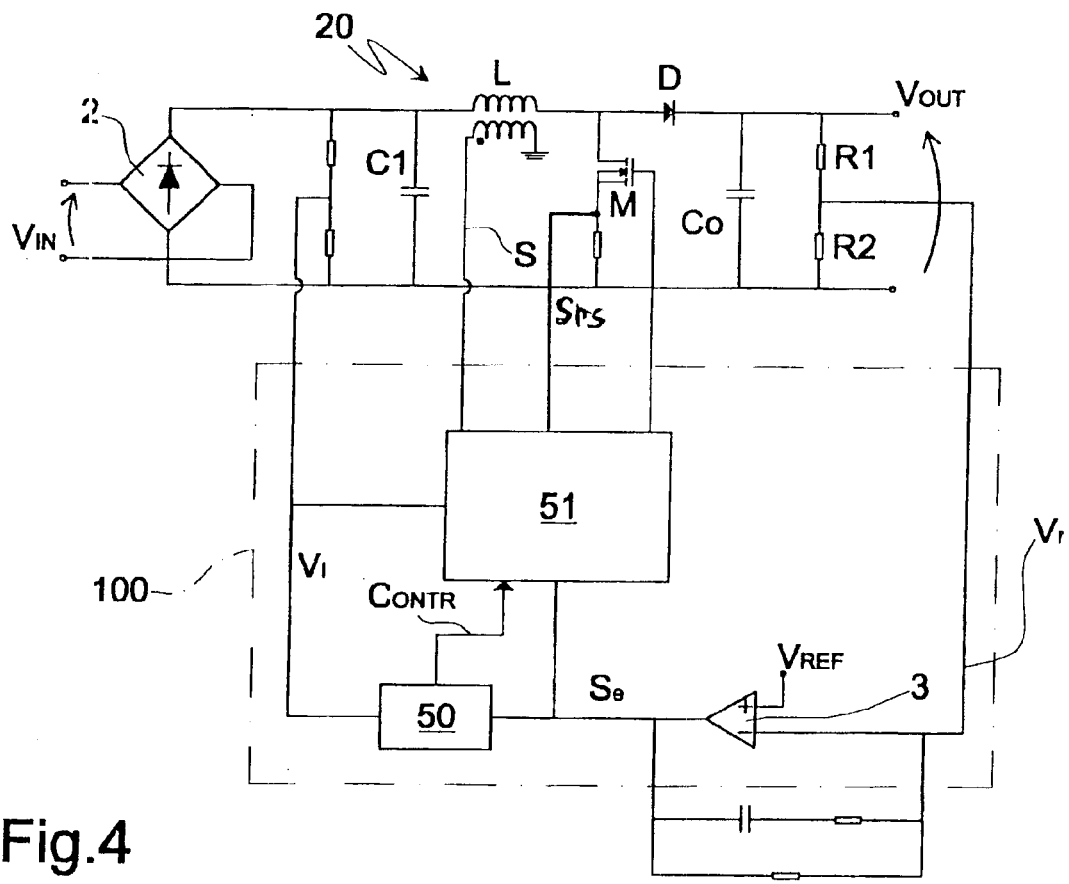
FIG. 4 is a circuit diagram of a PFC in transition mode for a power supply unit with forced switching according to a first embodiment of the present invention.

FIG. 4 shows a PFC for a power supply unit with forced switching operating in transition mode according to a first embodiment of the invention; the elements that are the same as the circuit in FIG. 1 will be indicated by the same references. The PFC comprises a boost converter 20 provided with a full-wave diode rectifier bridge 2 that has a network input voltage Vin, a capacitor C1 that has a terminal connected to the diode bridge 2 and the other terminal grounded, an inductor L connected to a terminal of the capacitor C1, a MOS M power transistor with its drain terminal connected to a terminal of the inductor L downstream of the latter and having the source terminal connected to a grounded resistance Rs, a diode D with its anode connected to the terminal shared by the inductor L and the transistor M and the cathode connected to a capacitor Co, the other terminal of which is grounded. The boost converter 20 generates a DC output voltage Vout that is greater than the network maximum peak voltage, typically 400 V for systems powered by European network or by universal power supplies.

The PFC comprises a control circuit 100 suitable for maintaining the output voltage Vout at a constant value by means of feedback control. The control circuit 100 comprises an error amplifier 3 suitable for comparing part of the output voltage Vout, in other words the voltage Vr supplied by $Vr=R2*Vout/(R2+R1)$ (where resistances R1 and R2 are serially connected together and are connected parallel to the capacitor Co) with a reference voltage Vref, for example 2.5V, and generates an error signal proportionate to their difference. Output voltage Vout presents an undulation, the frequency of which is twice that of the network supply and is superimposed on the DC value. If, however, the bandwidth of the error amplifier band is significantly reduced (typically below 20 Hz) by means of a suitable compensation network comprising a capacitor and we assume that operation is almost stationary, in other words with constant effective input voltage and constant output load, said undulation will be greatly attenuated and the steady-status error signal is substantially constant.

The error signal Se is sent to the input of a control block 51 that also has an input signal Vi that is proportionate to the network voltage Vin rectified by the diode bridge 2, a signal S that indicates the state of magnetization of the inductor L and a signal Srs that is proportionate to the current that flows through the transistor M. Referring to FIG. 1, The block 51 comprises the multiplier 4, the PWM comparator 5 and the control block 6 and is suitable for determining the period of switched-on time Ton and the period of switched-off time Toff of the MOS transistor M.

A circuit block 50 according to the first embodiment of the invention has signals Vi and/or Se and sends a signal Contr that enables the switched-on period Ton of the transistor M to be prolonged near the zeroes of the network voltage Vin, in other words when the network voltage assumes the value of a few Volts (for example 2V), a value that can be considered to be zero compared with the peak value of the network voltage.

Figure 5:
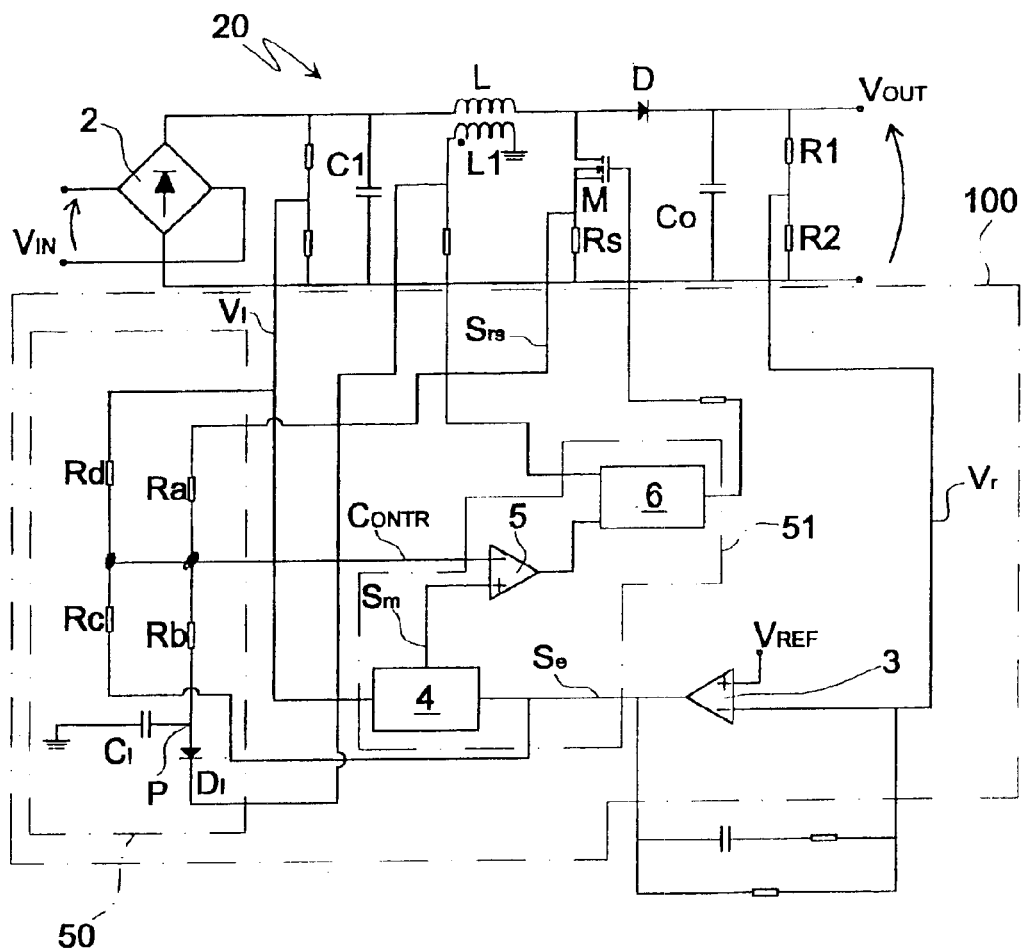
FIG. 5 is a circuit diagram of a PFC in transition mode for a power supply unit with forced switching according to the first embodiment of the present invention.

FIG. 5 shows a PFC for a power supply unit with forced switching operating in transition mode according to the first embodiment of the present invention; the elements which are the same as the circuits of FIGS. 1 and 4 will be indicated with the same references. In FIG. 5 the block 51 has been explained and comprises the multiplier 4 with input signals Vi and Se that sends a signal Sm to the non-inverting input of a PWM comparator 5 the output signal of which is on the input of the block 6. In the inverting input of the comparator 5 the signal Contr on the output of block 50 is present.

The latter comprises a resistance Ra connected on the one hand to the source terminal of the transistor M and to a terminal of the resistance Rs and on the other to the inverting input of the comparator 5 so as to take the signal Srs to the inverting input of the comparator. The block 50 also comprises a resistance Rb connected to the inverting input of the comparator 5 and to the anode of a diode Di and with a capacitor Ci, the other terminal of which is grounded. The cathode of the diode Di is connected to the auxiliary coil L1 of the inductor L.

During the period of switched-on time Ton of the MOS transistor M, when the voltage across the auxiliary coil L1 is negative, the diode Di enables charging of the capacitor Ci. In this way the negative voltage on the node P is proportionate to effective network voltage and depends on the turn ratio of the auxiliary coil L1. The resistance Rb provides this negative voltage, in other words an offset of negative voltage, in addition on the inverting node of the comparator 5 at the signal Srs.

A resistance Rc can be inserted between the output of the error amplifier 3 and the inverting input of the comparator 5;

in this way there is a variation in the offset of negative voltage as the output load varies because the voltage signal Se has a value that lowers as the input voltage Vin increases and the load decreases.

This solution produces a negative voltage offset during a semi-period of the network voltage Vin, nevertheless, the value of said voltage Vin in instants of time that are different from the instants in which said voltage is near zero is very high and the voltage offset does not have a substantial effect.

To preferably modulate said offset with the instant value of the network voltage so that the latter is less negative when it is far from the time instants in which the network voltage Vin assumes a zero value, a positive voltage component can be added to said offset that is zero near said zeroes of the network voltage Vin. This can be done by picking up the signal Vi at the input of multiplier 4 by means of the resistance Rd and taking it to the inverting input of the comparator 5.

The negative voltage offset influences the output signal from the comparator 5 in such a way as to determine a prolongation of the period of switched-on time Ton of the MOS transistor M.

To calibrate the circuit, one of the two resistances Ra and Rb can be fixed and the other one can be varied; calibrating is typically carried out with network voltage Vin at its maximum value, in other words in the conditions in which, generally, THD is at maximum in order to determine the overall resistance value that has the lowest THD.

Figure 6A:
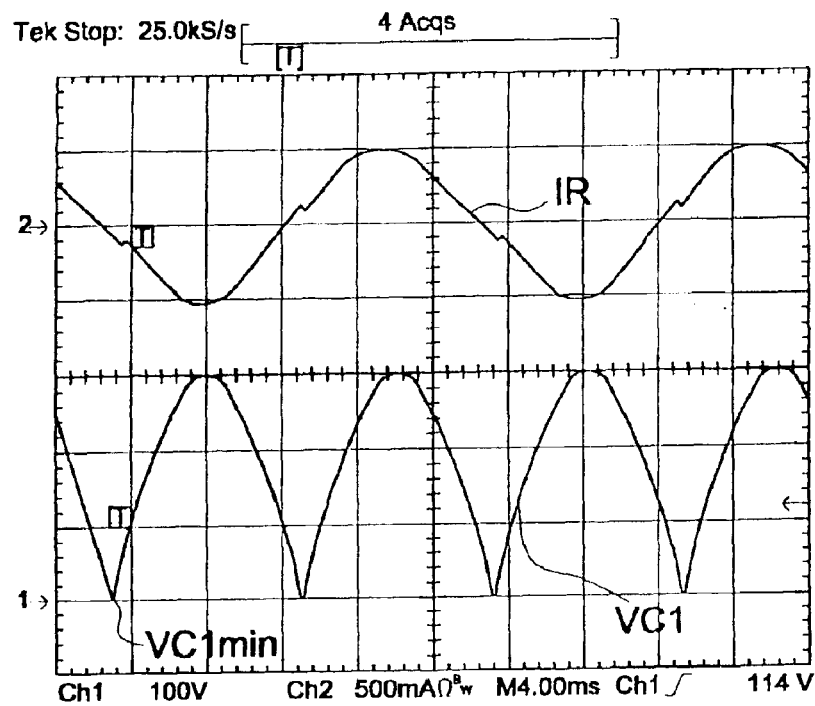
FIGS. 6a, 6b show diagrams obtained in an oscilloscope that show the network current and the rectified network voltage taken across of the capacitor located immediately after the rectifier bridge of the PFC with FIG. 5 with differing input power.
Figure 6B:
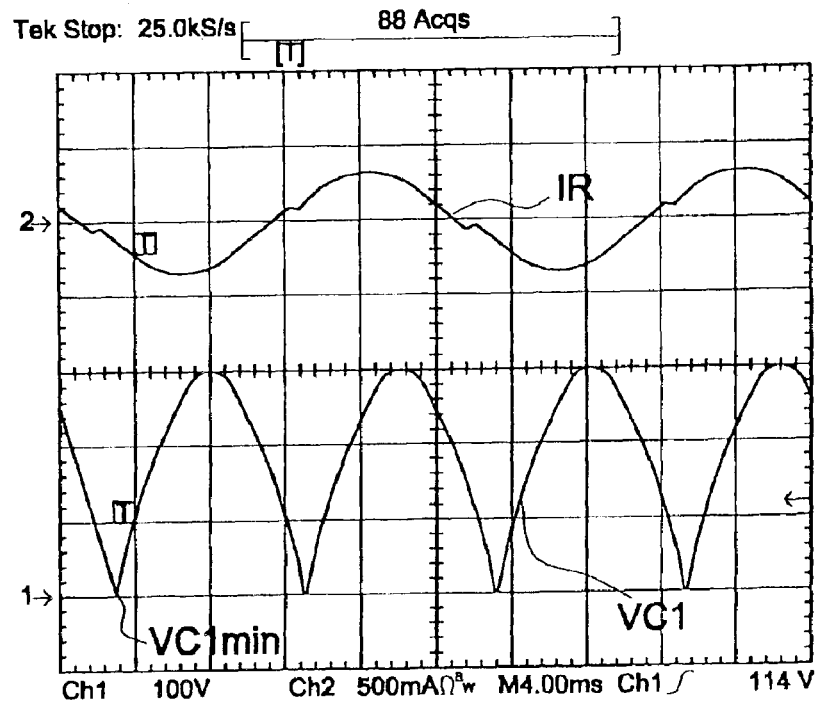
Figure 7:
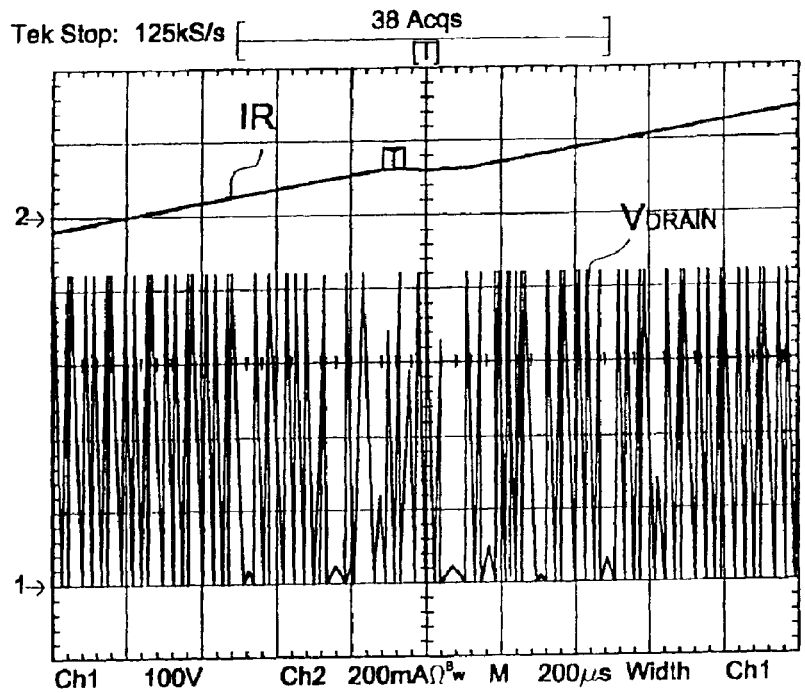
FIG. 7 shows, around a zero of the network voltage, the network current and the voltage on the drain terminal of the MOS transistor of the PFC converter of FIG. 5.

The effects of the correction made by the circuit 50 of FIG. 5 are shown in FIGS. 6a, 6b and 7.

FIGS. 6a, 6b show diagrams obtained in an oscilloscope that show the network current IR and the voltage VC1 across the capacitor C1 with a respective voltage of Vin=220VAC and pin power=80 W, and with Vin voltage=220VAC and Pin power=40 W.

FIG. 7 shows, around a zero of the network voltage, the network current IR and the voltage Vdrain on the drain terminal of the MOS transistor M.

Figure 8A:
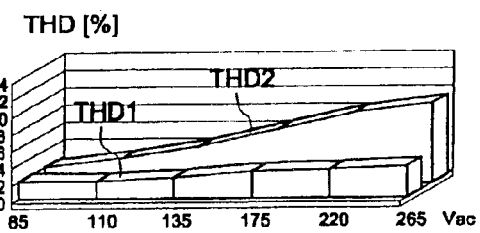
FIGS. 8a–8b show the percentage value of the THD for the PFC of FIG. 1 and for the PFC of FIG. 5 with differing output power.
Figure 8B:
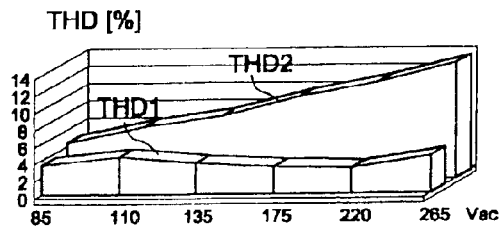

FIGS. 8a and 8b show the values of total harmonic distortion THD1 and TH2 respectively for the circuit of FIG. 5 and for the circuit of FIG. 1 with output power Pout=80 W (FIG. 8a) and with output power Pout=40 W (FIG. 8b).

Figure 9:
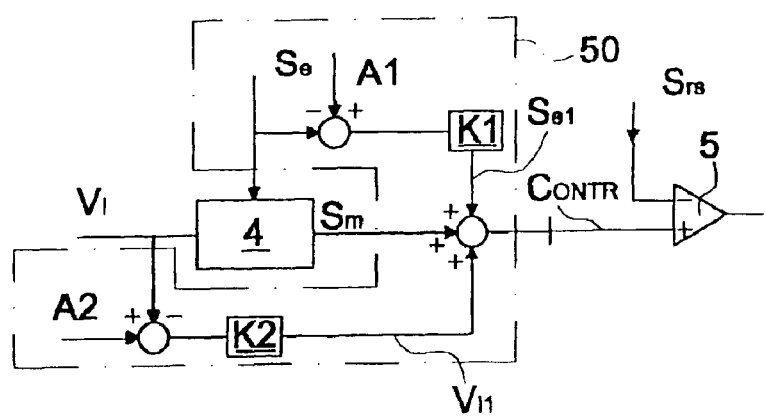
FIG. 9 is a block diagram of a PFC circuit in transition mode for a power supply unit with forced switching according to a second embodiment of the present invention.

FIG. 9 shows a block diagram of a circuit of a PFC for a power supply unit with forced switching operating in transition mode according to a second embodiment of the present invention. Said circuit comprises the block 50 of FIG. 4 and the multiplier 4 that has the input signals Vi and Se the provides the output signal Sm; the signal Contr leaving block 50 is sent to the non-inverting input of the comparator 5.

The block 50 enables a positive voltage offset to be added to the signal Sm leaving the multiplier 4 only during the instants of time in which the network voltage Vin has a value close to zero. The positive voltage offset is higher the higher is the network voltage Vin and the lower is the output load. The positive voltage offset is created by adding to the signal Sm from the multiplier 4 a small portion of the signal present on one of its inputs, in other words a portion of the signal Vi or a portion of the signal Se so as to obtain the signal Contr that is sent to the non-inverting input of the comparator 5. The positive voltage offset can also be achieved by adding portions of both the signals Se and Vi to the signal Sm to obtain the signal Contr.

The signal Vi is subtracted from a signal A2, which has a value that remains constant over time and the resulting signal is multiplied by a constant K2 in order to obtain the signal Vi1 that is added to the signal Sm to obtain the signal Contr.

Alternatively, or additionally, the signal Se is subtracted from a signal A1, which has a value that remains constant over time and the resulting signal is multiplied by a constant K1 in order to obtain the signal Se1 that is added to the Sm signal to obtain the signal Contr.

Figure 10:
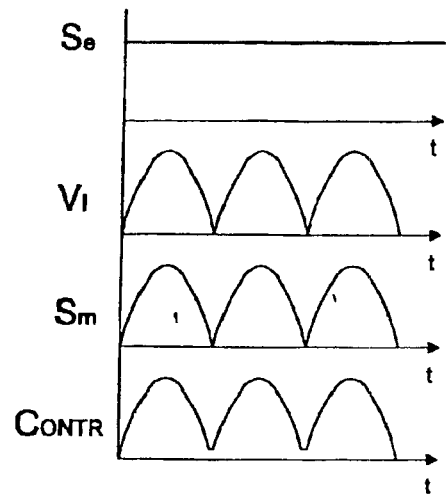
FIG. 10 shows the wave forms of significant signals of the circuit in FIG. 9.

FIG. 10 shows the time wave forms of the signals Se, Vi, Sm and Contr of FIG. 9; the latter differs from the signal Sm above by the fact that it does not take on the value zero.

Figures 11A, 11B:
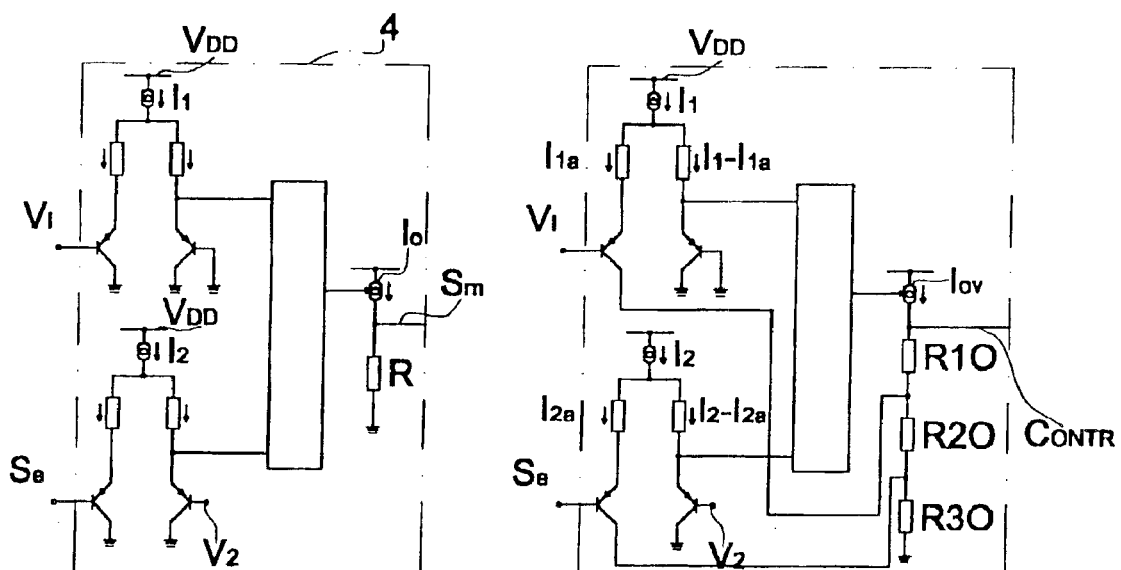
FIGS. 11a–11b show circuit diagrams of the multiplier in FIG. 1 and of the circuit in FIG. 9.

FIGS. 11a–11b show diagrams of a possible circuit embodiment of the multiplier 4 of FIG. 1 and of the circuit of FIG. 9 comprising the multiplier 4 and the block 50. The multiplier of FIG. 11a comprises an input stage provided with differential first and second stage. The first differential stage comprises two bipolar pnp transistors with collector terminals coupled to a voltage supply VDD and connected to a current generator I1 and grounded emitter terminals, and the second differential stage comprises two bipolar pnp transistors with collector terminals coupled to a voltage supply VDD and connected to a current generator I2 and the grounded emitter terminals. The base terminal of one of the transistors of the first stage is connected to the voltage Vi whilst the base terminal of the other transistor is grounded, the base terminal of one of the transistors of the second stage is connected to the voltage Se whilst the base terminal of the other transistor is connected to a 2.5 V reference voltage supply V2. The outlets of the two differential stages are at the input of an intermediate stage that pilots a current generator Io of an output stage that in turn flows along a resistance R. The signal Sm is given by Sm=Io*R.

The circuit in FIG. 11b is a circuit embodiment of the block 50 and of the multiplier 4 of FIG. 9. Said circuit differs from the one in FIG. 11a because instead of the resistance R there are three resistances R10, R20 and R30 connected serially to one another and because the terminals of the emitter of the transistors of the first and second differential stages having their gate terminals connected respectively to signals Vi and Sm are connected respectively to the terminals of the resistances R10 and R20 and to the terminals of the resistances R20 and R30. The outputs of the two differential stages are always at the input of an intermediate stage that pilots a current generator Iov of an output stage, which output stage in turn flows along the series of resistances R10, R20 and R30. The signal Contr is given by:

$$Contr=Iov*(R10+R20+R30)+I1a*(R20+R30)+I2a*R30$$

where I1a and I2a are the currents that circulate respectively in the first and second stage differential transistors with gate terminals connected respectively to the signals Vi and Sm.

Figure 12A:
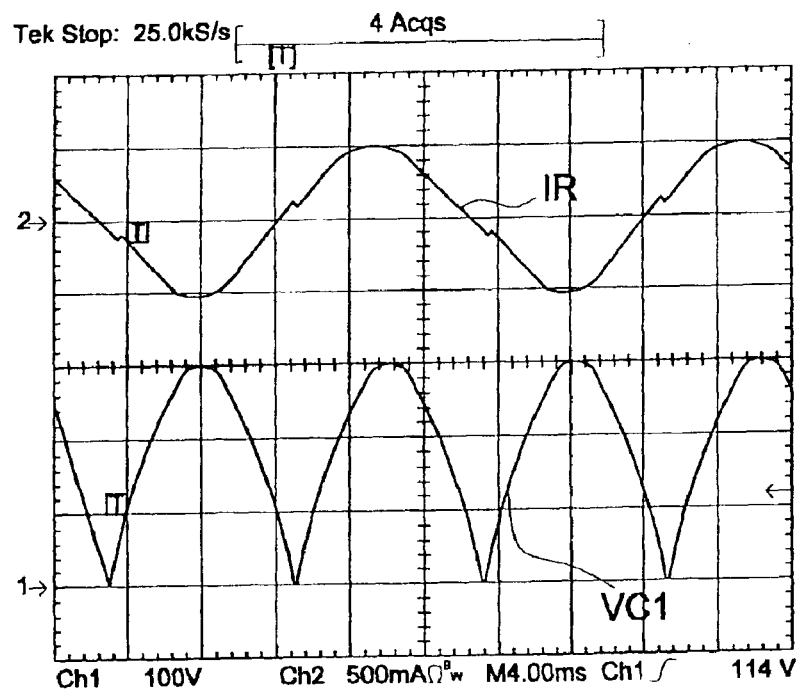
FIGS. 12a, 12b show diagrams obtained in an oscilloscope that show the network current and the rectified network voltage taken across the capacity located immediately after the rectifier bridge of the PFC according to the second embodiment of the present invention with differing input power.
Figure 12B:
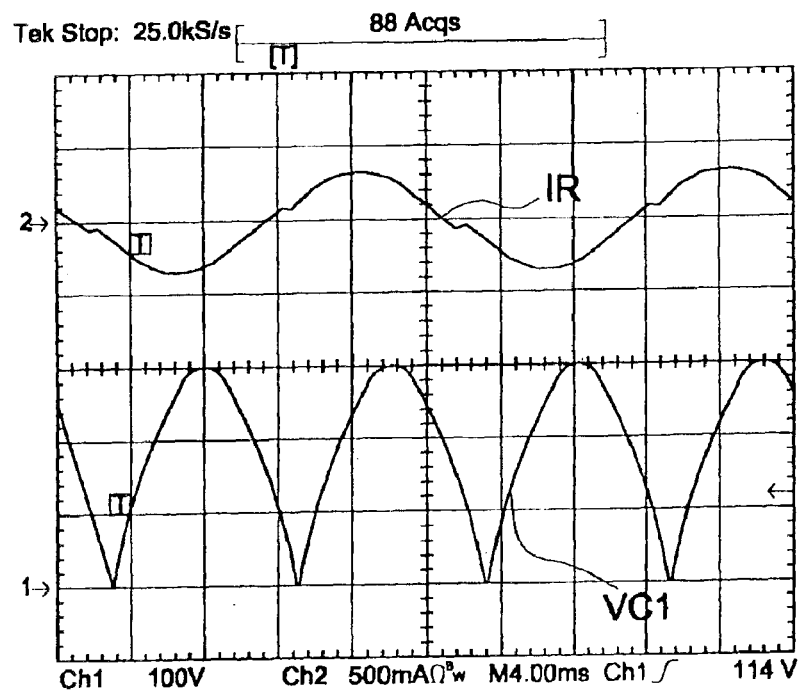

FIGS. 12a, 12b show diagrams obtained from an oscilloscope reading of an embodiment of the circuits in FIGS. 4 and 5, the diagrams showing the network current IR and the voltage VC1 across the capacity C1 with respectively a voltage Vin=220VAC and pin power=80 W, and with voltage Vin=220VAC and pin power=40 W.

Figure 13:
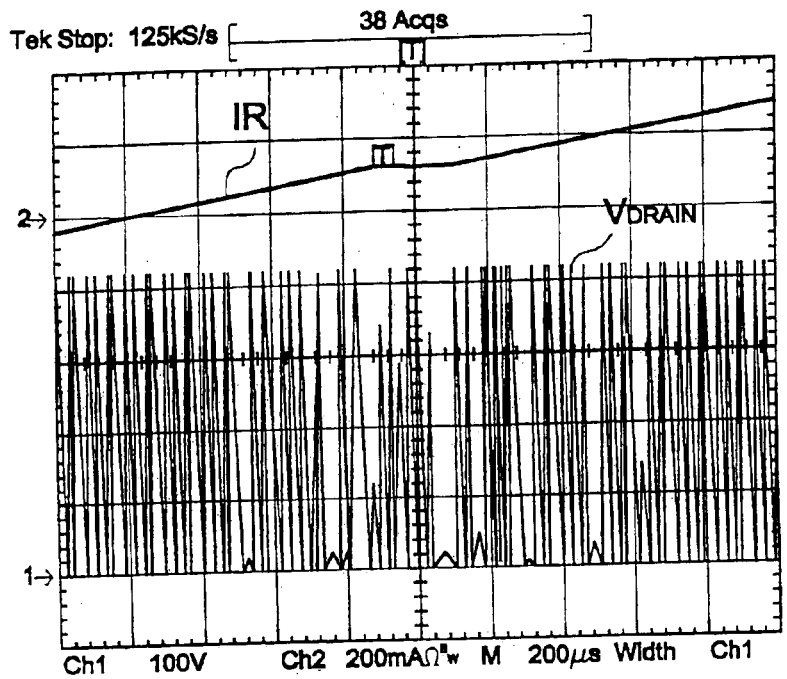
FIG. 13 shows, around a zero of the network voltage, the network current and the voltage on the drain terminal of the MOS transistor of the PFC converter according to the second embodiment of the present invention.

FIG. 13 shows, around a zero of the network voltage, the network current IR and the voltage Vdrain on the drain terminal of the MOS transistor M for one embodiment of the circuits of FIGS. 4 and 5.

Figure 14:
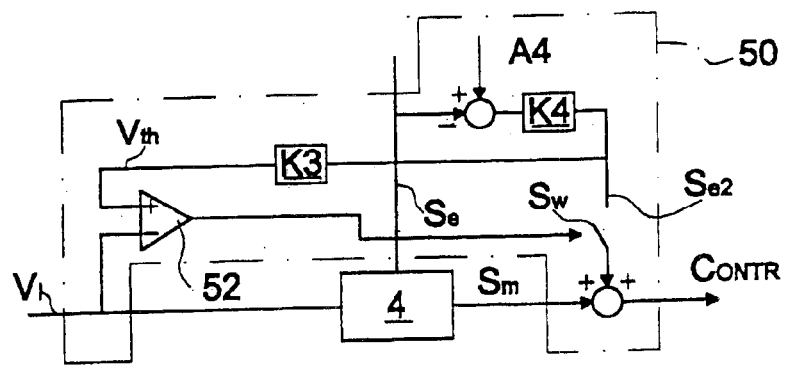
FIG. 14 is a diagram of another circuit of a PFC in transition mode for a power supply unit with forced switching according to a variation of the second embodiment of the present invention.

FIG. 14 shows a circuit diagram of a PFC in transition mode for a power supply unit with forced switching according to a variation of the second embodiment of the present invention. Said circuit comprises the block 50 of FIG. 4 and the multiplier 4 that has the signals Vi and Se at the input and provides the output signal Sm; the signal Contr at the block 50 output is sent to the non-inverting input of the comparator 5.

The block 50 enables a positive voltage offset to be added to the signal Sm at the multiplier 4 output only during the instants of time wherein the network voltage Vin has a value near zero. The positive voltage offset is higher the higher is the network voltage Vin and lower the lower is the output voltage. The positive voltage offset is created by adding a portion of the signal Se to the signal Sm in order to form the signal Contr to send to the non-inverting input of the comparator 5. Nevertheless, this addition is made only when the signal Vi is lower than a reference value Vth, which is preferably given by the signal Se2 for a constant K3; a comparator 52 in fact compares the signals Vi, which persists on the inverting input, and Vth, which persists on the non-inverting input, and if Vi<Vth sends a signal to a switch SW that enables the addition of the signal Se2 to the signal Sm.

The signal Se is subtracted from a signal A4 of a value that remains constant over time and the resulting signal is multiplied by a constant K4 so as to obtain the signal Se2 that is added to the signal Sm to obtain the signal Contr.

The circuits of FIGS. 9 and 14 can be integrated into the same chip with the block 51 and the error amplifier 3 of the control circuit 100.

Furthermore, the circuits of FIGS. 4 and 5 can be incorporated into an electronic system such as a computer system.

From the foregoing it will be appreciated that, although specific embodiments of the invention have been described herein for purposes of illustration, various modifications may be made without deviating from the spirit and scope of the invention.

What is claimed is:

1. Device for the correction of the power factor in power supply units with forced switching operating in transition mode, comprising a converter and a control device coupled to said converter so as to obtain from a network alternating input voltage regulated voltage on the output terminal, said converter comprising a power transistor, said control device comprising a pilot circuit suitable for determining the switched-on time of said power transistor in response to said regulated voltage and for determining the switched-off time of said power transistor, wherein said control device comprises control means coupled to said pilot circuit and with said converter and capable of prolonging said period of switched-on time of the power transistor at the instants of time in which said alternating main voltage assumes a value that is substantially zero.

2. Device according to claim 1 wherein said converter comprises a rectifier circuit of said network input voltage, said control device comprises an error amplifier having a first signal on the inverting input that is proportionate to said regulated voltage and a reference signal on the non-inverting terminal, and said pilot circuit comprises a multiplier having a second signal at the input that is proportionate to the voltage rectified by said rectifier circuit and an error signal at the output from said error amplifier, a comparator that is suitable for comparing a third signal at the output from said multiplier and a fourth signal proportionate to the current that flows through said power transistor, a fifth signal at the output from said comparator being suitable for determining the period of switched-on time and of switched-off time of said power transistor, said control means being suitable for increasing the value of one of the said third and fourth signals at the comparator input at the time instants wherein the network voltage has a value that is substantially zero.

3. Device for the correction of the power factor in power supply units with forced switching operating in transition mode, comprising:
a converter and a control device coupled to said converter so as to obtain from a network alternating input voltage a regulated voltage on the output terminal, said converter comprising a power transistor, said control device comprising a pilot circuit suitable for determining the switched-on time and the switched-off time of said power transistor;
wherein said control device comprises control means coupled to said pilot circuit and with said converter and capable of prolonging said period of switched-on time of the power transistor at the instants of time in which said alternating main voltage assumes a value that is substantially zero;
wherein said converter comprises a rectifier circuit of said network input voltage, said control device comprises an error amplifier having a first signal on the inverting input that is proportionate to said regulated voltage and a reference signal on the non-inverting terminal, and said pilot circuit comprises a multiplier having a second signal at the input that is proportionate to the voltage rectified by said rectifier circuit and an error signal at the output from said error amplifier, a comparator that is suitable for comparing a third signal at the output from said multiplier and a fourth signal proportionate to the current that flows through said power transistor, a fifth signal at the output from said comparator being suitable for determining the period of switched-on time and of switched-off time of said power transistor, said control means being suitable for increasing the value of one of the said third and fourth signals at the comparator input at the time instants wherein the network voltage has a value that is substantially zero; and
wherein said control means comprises a circuit means capable of adding a negative voltage offset to said fourth signal.

4. Device according to claim 3 wherein said converter comprises an inductor arranged between a non-pilotable terminal of said power transistor and said rectifier circuit and said device for the correction of the power factor comprises an auxiliary coil of said inductor, said circuit means being connected to said auxiliary coil and to the output of said error amplifier and determining said voltage offset during the period of switched-on time of said power transistor when the voltage signal at the heads of said auxiliary coil assumes a negative value.

5. Device according to claim 4 wherein said circuit means comprise a diode having a cathode connected to said auxiliary coil and the anode connected to a terminal of a capacitor the other terminal be earthed to a terminal of a first resistance the other terminal being connected to the input of the comparator on which said fourth signal is present, a second resistance arranged between the output of said error amplifier and the input of the comparator on which said fourth signal is present.

6. Device according to claim 5 wherein said circuit means comprise a third resistance on a terminal of which said second signal persists and the other terminal being connected to the input of the comparator on which said fourth signal is present.

7. Device for the correction of the power factor in power supply units with forced switching operating in transition mode, comprising:
a converter and a control device coupled to said converter so as to obtain from a network alternating input voltage a regulated voltage on the output terminal, said converter comprising a power transistor, said control device comprising a pilot circuit suitable for determining the switched-on time and the switched-off time of said power transistor;

wherein said control device comprises control means coupled to said pilot circuit and with said converter and capable of prolonging said period of switched-on time of the power transistor at the instants of time in which said alternating main voltage assumes a value that is substantially zero;

wherein said converter comprises a rectifier circuit of said network input voltage, said control device comprises an error amplifier having a first signal on the inverting input that is proportionate to said regulated voltage and a reference signal on the non-inverting terminal, and said pilot circuit comprises a multiplier having a second signal at the input that is proportionate to the voltage rectified by said rectifier circuit and an error signal at the output from said error amplifier, a comparator that is suitable for comparing a third signal at the output from said multiplier and a fourth signal proportionate to the current that flows through said power transistor, a fifth signal at the output from said comparator being suitable for determining the period of switched-on time and of switched-off time of said power transistor, said control means being suitable for increasing the value of one of the said third and fourth signals at the comparator input at the time instants wherein the network voltage has a value that is substantially zero; and wherein said control means comprises a circuit capable of adding a portion of either the second signal or the error signal to the third signal leaving said multiplier.

8. Device according to claim 7 wherein either the second signal or the error signal is subtracted from a constant level signal and is multiplied by a constant to obtain said signal portion to add to the third signal.

9. Device according to claim 7 wherein said control means can be integrated into a chip with the pilot circuit of said control device.

10. Device for the correction of the power factor in power supply, units with forced switching operating in transition mode, comprising;

a converter and a control device coupled to said converter so as to obtain from a network alternating input voltage a regulated voltage on the output terminal, said converter comprising a power transistor, said control device comprising a pilot circuit suitable for determining the switched-on time and the switched-off time of said power transistor;

wherein said control device comprises control means coupled to said pilot circuit and with said converter and capable of prolonging said period of switched-on time of the power transistor at the instants of time in which said alternating main voltage assumes a value that is substantially zero;

wherein said converter comprises a rectifier circuit of said network input voltage, said control device comprises an error amplifier having a first signal on the inverting input that is proportionate to said regulated voltage and a reference signal on the non-inverting terminal, and said pilot circuit comprises a multiplier having a second signal at the input that is proportionate to the voltage rectified by said rectifier circuit and an error signal at the output from said error amplifier, a comparator that is suitable for comparing a third signal at the output from said multiplier and a fourth signal proportionate to the current that flows through said power transistor, a fifth signal at the output from said comparator being suitable for determining the period of switched-on time and of switched-off time of said power transistor, said control means being suitable for increasing the value of one of the said third and fourth signals at the comparator input at the time instants wherein the network voltage has a value that is substantially zero; and wherein said control means comprises a circuit capable of adding a first portion of the second signal and a second portion of the error signal to the third signal leaving said multiplier.

11. Device according to claim 10 wherein the second signal and the error signal are subtracted from constant level signals and are multiplied by a constant to obtain said first and second signal portion to add to said third signal.

12. Device for the correction of the power factor in power supply units with forced switching operating in transition mode, comprising:

a converter and a control device coupled to said converter so as to obtain from a network alternating input voltage a regulated voltage on the output terminal, said converter comprising a power transistor, said control device comprising a pilot circuit suitable for determining the switched-on time and the switched-off time of said power transistor;

wherein said control device comprises control means coupled to said pilot circuit and with said converter and capable of prolonging said period of switched-on time of the power transistor at the instants of time in which said alternating main voltage assumes a value that is substantially zero;

wherein said converter comprises a rectifier circuit of said network input voltage, said control device comprises an error amplifier having a first signal on the inverting input that is proportionate to said regulated voltage and a reference signal on the non-inverting terminal, and said pilot circuit comprises a multiplier having a second signal at the input that is proportionate to the voltage rectified by said rectifier circuit and an error signal at the output from said error amplifier, a comparator that is suitable for comparing a third signal at the output from said multiplier and a fourth signal proportionate to the current that flows through said power transistor, a fifth signal at the output from said comparator being suitable for determining the period of switched-on time and of switched-off time of said power transistor, said control means being suitable for increasing the value of one of the said third and fourth signals at the comparator input at the time instants wherein the network voltage has a value that is substantially zero; and wherein said control means comprises a circuit capable of adding a portion of the error signal to the third signal at the output from said multiplier when said second signal is below a set value.

13. Device according to claim 12 wherein the error signal is subtracted from a constant level signal and is multiplied by a constant to obtain said signal portion to add to said third signal only if said second signal is lower than said set value.

14. Device according to claim 13 wherein said set value is said signal portion multiplied by a constant.

15. A controller for regulating an output signal that a boost converter generates from a time-varying input signal having an amplitude, the boost converter having a power switch and the amplitude of the input signal having a crossover point, the controller comprising:

an error circuit operable to periodically activate the power switch for an on period that is related to the input and output signals; and a distortion-reducing circuit coupled to the error circuit and operable to lengthen the on period as the amplitude of the input signal decreases while the amplitude is within a predetermined range.

16. The controller of claim 15 wherein the error circuit comprises:

an amplifier operable to generate an error signal that is related to the output signal;

a multiplier operable to generate a product of the error signal and a first signal derived from the input signal; and a comparator operable to allow the power switch to remain active while a second signal derived from a current through the switch is less than the product.

17. The controller of claim 15 wherein the predetermined amplitude range includes the crossover amplitude.

18. The controller of claim 15 wherein the predetermined amplitude range is substantially centered about the crossover amplitude.

19. A controller for regulating an output signal that a boost converter generates from a time-varying input signal, the boost converter having a power switch and the input signal having a crossover amplitude, the controller comprising:

an error circuit operable to periodically activate the power switch for an on period that is related to the input and output signals; and a distortion-reducing circuit coupled to the error circuit and operable to lengthen the on period while the input signal is within a predetermined amplitude range;

wherein the error circuit comprises:
an amplifier operable to generate an error signal that is related to the output signal,
a multiplier operable to generate a product of the error signal and a first signal derived from the input signal, and
a comparator operable to allow the power switch to remain active while a second signal derived from a current through the switch is less than the product;

wherein the distortion-reducing circuit is operable to add an offset signal to the second signal while the input signal is within the predetermined amplitude range;

wherein the on period begins substantially when a current through an inductor equals zero; and wherein the on period ends substantially when a sum of the second signal and the offset signal equals the product of the error voltage and the first signal.

20. A power supply, comprising:

a boost converter having a power switch and operable to generate an output voltage from a time-varying input voltage signal having an amplitude; and a controller coupled to the converter and including,
an error circuit operable to periodically activate the power switch for an on period that is related to the input voltage signal and the output voltage; and
a distortion-reducing circuit coupled to the error circuit and operable to lengthen the on period as the amplitude of the input voltage signal decreases while the amplitude is within a predetermined voltage range.

21. The power supply of claim 20 wherein the input voltage signal comprises a sinusoidal voltage signal.

22. An electronic system, comprising:

a power supply that includes,
a boost converter having a power switch and operable to generate an output voltage from a time-varying input voltage signal having an amplitude, and
a controller coupled to the converter and including,
an error circuit operable to periodically activate the power switch for an on period that is related to the input voltage signal and the output voltage; and
a distortion-reducing circuit coupled to the error circuit and operable to lengthen the on period as the amplitude of the input voltage signal decreases while the amplitude is within a predetermined voltage range.

23. A method, comprising:

generating an output signal from a time-varying input signal having an amplitude;

regulating the output signal by periodically drawing current through an inductor for an on period that is related to the input and output signals; and lengthening the on period as the amplitude of the input signal decreases while the amplitude is within a predetermined range.

24. The method of claim 23 wherein lengthening the on period comprises lengthening the on period while the amplitude of the input signal is within a predetermined range that includes zero amplitude.

25. The method of claim 23 wherein lengthening the on period comprises periodically drawing the current through the inductor by closing a switch for the on period.

26. The method of claim 23 wherein:

the output signal comprises a substantially DC voltage signal;

the input signal comprises a sinusoidal voltage signal; and the predetermined range comprises a predetermined voltage range.

27. The method of claim 23 wherein:

regulating the output signal comprises,
generating an error signal by comparing the output signal to a reference signal,
generating a comparison product by multiplying the error signal by the input signal,
comparing the comparison product with a comparison signal that represents the current drawn through the inductor during the on period, and
ceasing drawing current through the inductor when the comparison signal equals or exceeds the comparison product; and lengthening the on period comprises adding an offset signal to the comparison signal.

28. The method of claim 27, further comprising generating the offset signal in relation to the current through the inductor.

29. The method of claim 27, further comprising generating the offset signal in relation to the input signal.

30. The method of claim 27, further comprising generating the offset signal in relation to the error signal.

31. The method of claim 27, further comprising generating the offset signal in relation to the comparison signal.

* * * * *

UNITED STATES PATENT AND TRADEMARK OFFICE
CERTIFICATE OF CORRECTION

PATENT NO. : 6,946,819 B2
APPLICATION NO. : 10/633321
DATED : September 20, 2005
INVENTOR(S) : Mauro Fagnani, Albino Pidutti and Claudio Adragna It is certified that error appears in the above-identified patent and that said Letters Patent is hereby corrected as shown below:

Column 9,
Line 39, insert -- a -- after first occurrence of "voltage".

Column 11,
Line 42, delete ",".

Signed and Sealed this

Fourth Day of July, 2006

JON W. DUDAS
*Director of the United States Patent and Trademark Office*